United States Patent [19]
Chéron et al.

[11] Patent Number: 5,847,525
[45] Date of Patent: Dec. 8, 1998

[54] CONTROL DEVICE FOR ASYNCHRONOUS MOTOR OF SHUTTER OR ROLLER BLIND

[75] Inventors: Eric Chéron, Taninges; Emeric Motte, Sallanches, both of France

[73] Assignee: Somfy, France

[21] Appl. No.: 924,780

[22] Filed: Sep. 5, 1997

[30] Foreign Application Priority Data

Sep. 30, 1996 [FR] France .................................. 96 11857

[51] Int. Cl.[6] ..................................................... H02P 5/00
[52] U.S. Cl. ........................... 318/468; 160/310; 318/280
[58] Field of Search .................. 318/266, 285, 318/466–470, 286, 280; 49/349, 352; 160/166.1–168.1, 7, DIG. 14, 310, 311, 331

[56] References Cited

U.S. PATENT DOCUMENTS

| 4,665,965 | 5/1987 | Pasquier et al. ......................... 160/310 |
|---|---|---|
| 4,712,104 | 12/1987 | Kobayashi .......................... 340/825.52 |
| 5,038,087 | 8/1991 | Archer et al. ............................ 318/469 |
| 5,170,108 | 12/1992 | Peterson et al. ......................... 318/469 |
| 5,198,974 | 3/1993 | Orsat ................................. 364/167.01 |
| 5,402,047 | 3/1995 | Bresson et al. .......................... 318/287 |
| 5,444,339 | 8/1995 | Domel et al. .............................. 318/17 |
| 5,532,560 | 7/1996 | Element et al. ......................... 318/266 |
| 5,642,022 | 6/1997 | Sanz et al. ............................... 318/468 |

FOREIGN PATENT DOCUMENTS

0439422A1  1/1991  European Pat. Off. .
2671129  12/1990  France .

*Primary Examiner*—Brian Sircus
*Attorney, Agent, or Firm*—Laff, Whitesel, Conte & Saret, Ltd.

[57] ABSTRACT

The device comprises a control point (CP) equipped with Up and Down contacts, the actuation of which causes the rotation of the motor in the desired direction, a control and supply box (CB) containing a logic processing unit (LPU), switching means controlled by the logic unit and means for establishing a direction of rotation of the motor. The means for establishing a direction of rotation of the motor furthermore comprise means (LPU, CLK, DC) for recognizing the direction of rotation of the shutter or roller blind, a memory of EEPROM type (MI) for recording the direction of rotation of the motor instruction issued by the control point and a programmed processor for comparing the recognized direction of displacement with the instruction emanating from the control point.

7 Claims, 5 Drawing Sheets

CONTROL DEVICE FOR ASYNCHRONOUS MOTOR OF SHUTTER OR ROLLER BLIND

FIELD OF THE INVENTION

A control device for asynchronous motor with two directions of rotation, used for driving a shutter or roller blind displacing at least approximately vertically, comprising a control point equipped with manually actuable Up and Down contacts, the actuation of which causes the rotation of the motor in the desired direction, a control and supply box, containing a logic processing unit, between the control point and the motor, switching means controlled by the logic processing unit for supplying one or the other of the windings of the motor and means for establishing a direction of rotation of the motor corresponding respectively to the Up and Down instructions.

PRIOR ART

In most of the known installations comprising a shutter, a roller blind or a door controlled by an asynchronous motor with two directions of rotation, the windings corresponding to each of the directions of rotation are linked to the electrical supply by way of the control point contacts labeled with "Up" and "Down" tags. It is therefore important that, during wiring, the Up and Down contacts are each linked to the winding the supplying of which drives a rotation of the motor in such a way as effectively to take the shutter or roller blind up and down. However, whether the shutter or roller blind goes up or down does not depend only on the correct labeling of the conductors during connection, but also on the orientation of the motor. This motor can indeed take two symmetrical positions, depending on whether it is installed on one side or the other of the bay in which the shutter or roller blind is fitted, the resulting movement being either up, or down, depending on the position of the motor, for one and the same direction of rotation thereof. Hence, it is generally necessary to switch on and carry out a test before making the finalized connection. Such a procedure is a loss of time and furthermore is not always easily possible, given the sometimes very difficult access to the motor.

Patent FR 2 671 129 of the applicant describes a control device which includes, between the control point and the motor, a control and supply box containing a logic processing unit in which is stored a motor direction of rotation reversal program. The implementation of this reversal program is effected at the control point by an additional contact whose activation, at the same time as the Halt contact, brings about the recording, by the brain of the automechanism, of the reversal of the instruction/control relation. So that this additional contact is not actuated inadvertently it is concealed behind a cover, which can be easily opened, of the box of the control point. This additional contact is not furthermore intended to be actuated by the user but by a technician, that is to say the installer. Now, the presence of a technician when switching on is constraining since it frequently corresponds to a return to the work site. Thus, this technician will very often have installed his motorization some time before the low voltage is available for possible trials.

SUMMARY OF THE INVENTION

The purpose of the invention is to produce a control device capable of auto-configuring, that is to say a control device capable of learning which direction of rotation of the motor corresponds to the instruction issued by the user, this learning not having to require the intervention of a technician.

The control device according to the invention is one wherein the means for establishing a direction of rotation of the motor comprise means for recognizing the direction of displacement of the shutter or roller blind through the measurement of a quantity representative of the speed of rotation of the motor and, in the logic processing unit, a memory of EEPROM type for recording the direction of rotation instruction to be issued to the motor in response to an instruction emanating from a control point and a programmed processor for comparing the recognized direction of displacement with the instruction emanating from the control point and for reversing, if necessary, the direction of rotation recorded in respect of this instruction.

Thus, when first switching on the installation, the user need merely issue any instruction, up or down, for the motor of the control device to respond correctly to the instruction issued.

The invention uses the fact that the motor delivers greater effort when winding than when unwinding and that it consequently turns less quickly when winding than when unwinding.

The quantity representative of the speed of rotation of the motor can be, for example, the time taken by the shutter or roller blind to perform a significant displacement or the measurement of the displacement of the shutter or roller blind for a significant time. In these two modes of execution the means of implementation are simple.

BRIEF DESCRIPTION OF THE DRAWINGS

These two modes of execution will be described below, by way of example, in relation with the appended drawing.

DESCRIPTION OF THE PREFERRED EMBODIMENT(S)

Figure 1:
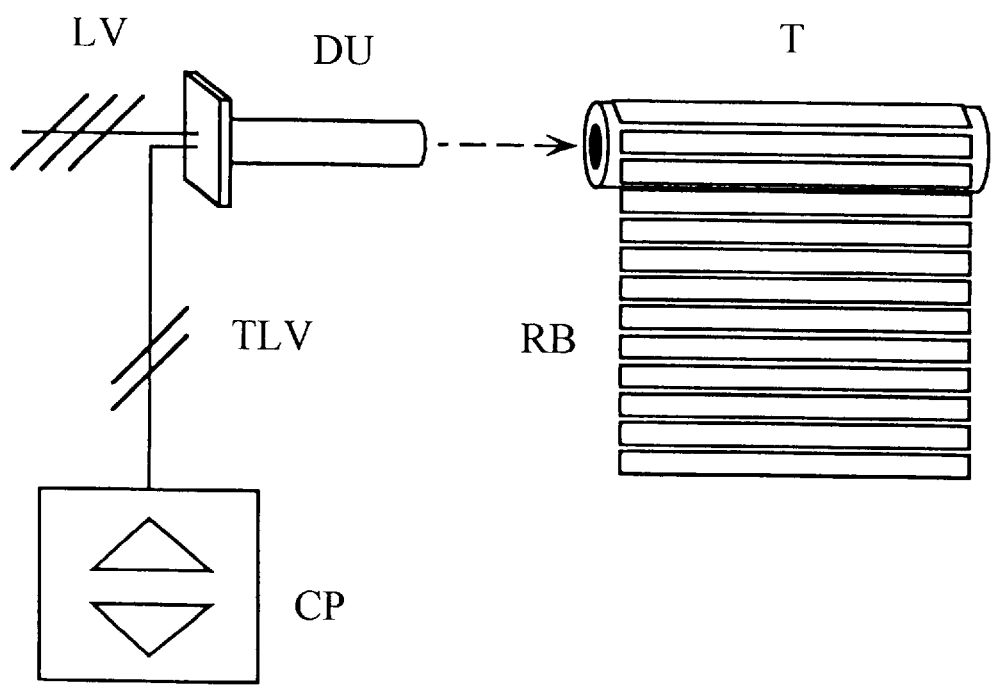
FIG. 1 is a very schematic view of a roller blind and of its control device.
Figure 2:
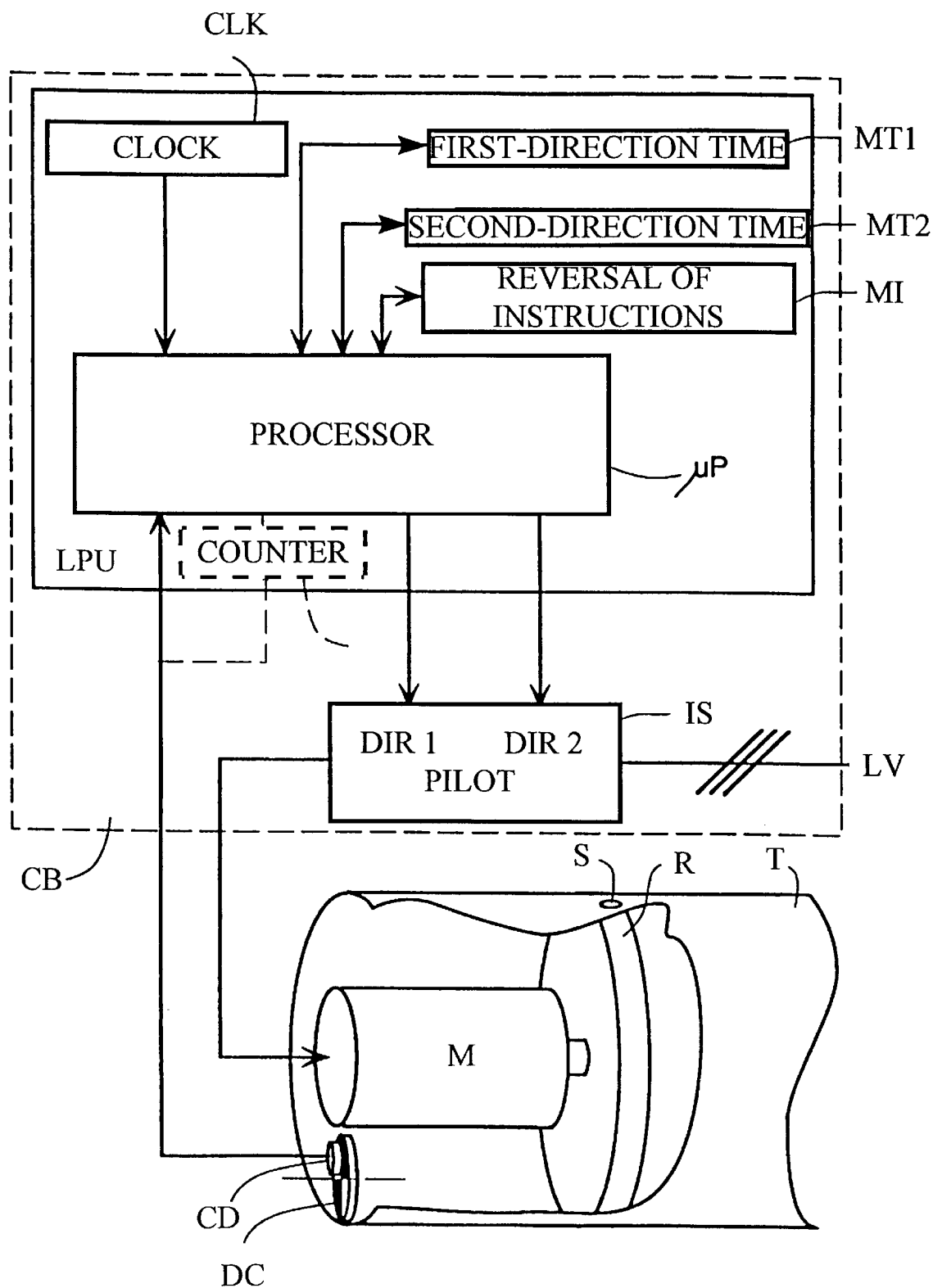
FIG. 2 represents the winding tube with its drive motor and the logic processing unit.

The installation represented schematically in FIG. 1 comprises a winding tube T on which will be wound a roller blind RB and in which is fitted a drive unit DU for driving the tube T in rotation. This drive unit DU comprises a monophase asynchronous motor M (FIG. 2) and a control brain consisting of a logic processing unit LPU (FIG. 2). The motor M is supplied under monophase low voltage through a three-wire cable labeled LV, whilst the LPU is linked by a two-wire cable TLV to a control point CP equipped with an Up contact and a Down contact. The LPU and its interfaces are fitted in a control box CB associated with the motor M.

In FIG. 2 may be seen the winding tube T in which the motor M is fitted, this being more precisely a reduction motor whose output shaft drives a driving wheel R fixed at a point S to the winding tube T. A device for counting the number of revolutions and fractions of a revolution performed by the winding tube is furthermore fitted at the winding tube end represented. This counting device is of well-known optoelectronic type. It consists essentially of a coder disc C driven in rotation by the winding tube T and of a photoelectric cell CD linked to the LPU. The number of revolutions and fractions of a revolution performed by the winding tube is a value representative of the displacement of the roller blind.

The LPU includes a processor µP, a clock CLK consisting of an initializable real-time counter, a memory MT1 of RAM type for storing a time of first direction of rotation, a memory MT2 of RAM type for storing a time of second direction of rotation and a memory MI of EEPROM type for storing the reversal of the Up and Down instructions. Between the LPU and the motor M is furthermore arranged an interface IS for applying the supply voltage to the motor M in a way corresponding to the direction of rotation determined by the LPU.

The schematic of FIG. 2 is valid for the first mode of execution and its variant, which differ from one another only through the programming of the processor.

Figure 3:
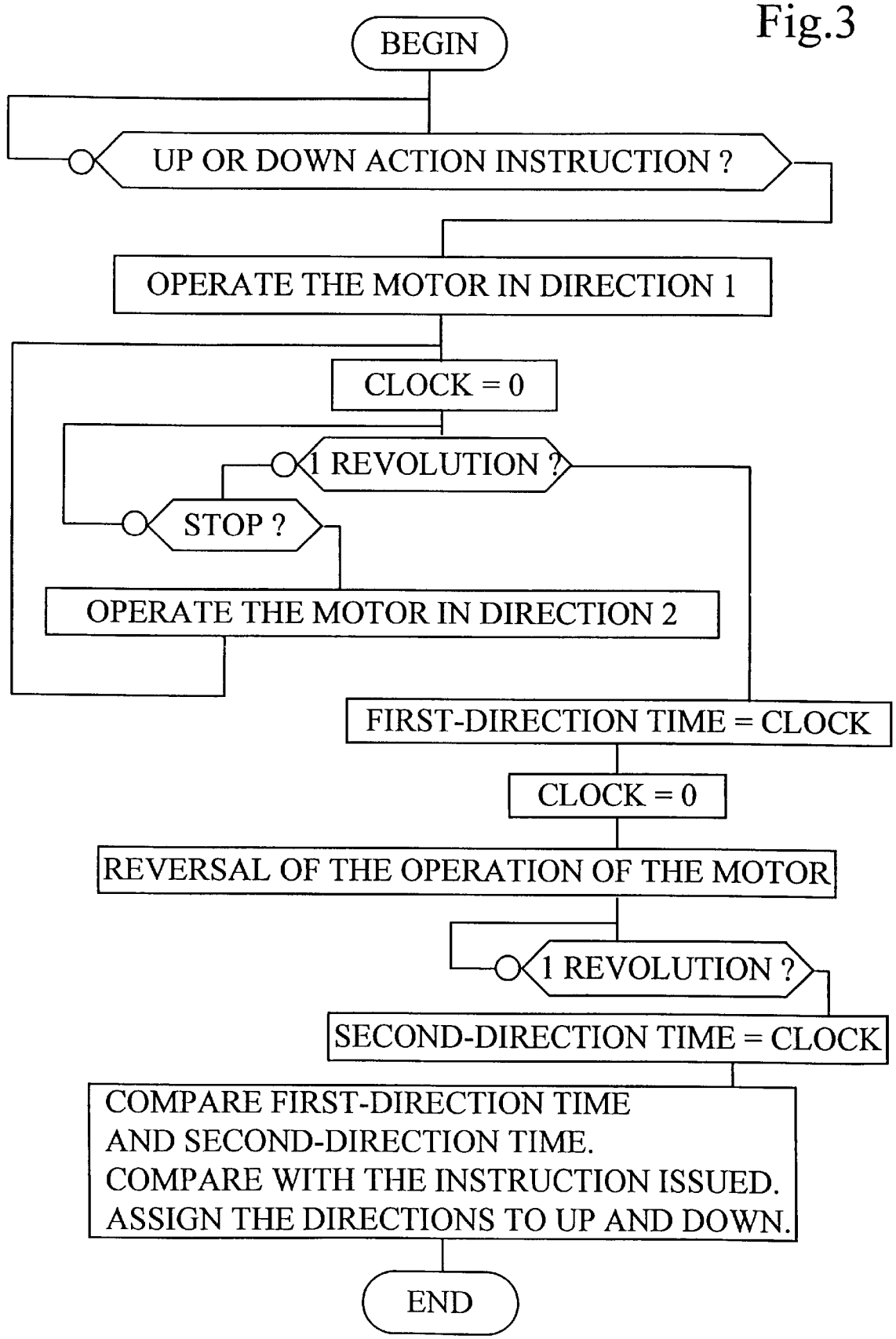
FIG. 3 represents the flowchart of the program of the first mode of execution.

According to the first mode of execution, the time taken by the roller blind to perform a significant up and down displacement is measured and these times are compared, the shorter time corresponding to down and the longer time to up. The flowchart of the corresponding program is represented in FIG. 3.

This flowchart will be run through with the aid of an example. Let us assume that the user issues an up instruction. On receiving this instruction, the LPU instructs a movement in the direction 1 and initializes the clock CLK. Let us assume to begin with that the roller blind has performed a specified significant displacement, corresponding in this instance to one revolution of the winding tube T, without encountering a stop. Displacement is then interrupted and the state of the clock time counter is saved in the memory MT1 which stores the first-direction time. The processor reinitializes the clock and instructs the motor to turn in the other direction, that is to say in the second direction. After having again performed the significant displacement, the roller blind comes to a halt and the state of the clock time counter is again saved, now in the memory MT2 which stores the second-direction time.

The processor compares the first-direction time with the second-direction time, and then compares the result of this comparison with the up instruction which it received. Since asynchronous machines do not turn at the same speed depending on whether they are acting as motors or generators, the time taken by the motor to wind the roller blind is greater than the time taken by the motor to unwind the roller blind which then drives the motor.

Consequently, if the first-direction time is greater than the second-direction time, this implies that the direction of rotation 1 instructed by the LPU corresponds to winding and that the action performed complies with the instruction received by the LPU. The automechanism retains its initial assignment: with an up instruction, the motor turns in its consequent first direction, and in its second for a down instruction. This assignment is stored permanently in the instructions reversal memory MI. The memory MI is consulted by the brain of the automechanism before obeying a subsequent instruction.

If, on the other hand, the first-direction time is less than the second-direction time, this implies that the action performed is contrary to the instruction received by the LPU and the latter then assigns an up instruction the second direction and a down instruction the first direction.

In the flowchart of FIG. 3, if the roller blind encounters a stop before having performed the significant displacement, the direction of rotation of the motor is then reversed and the time taken to perform the significant displacement is measured to begin with in the second direction and then in the first direction.

Figure 4:
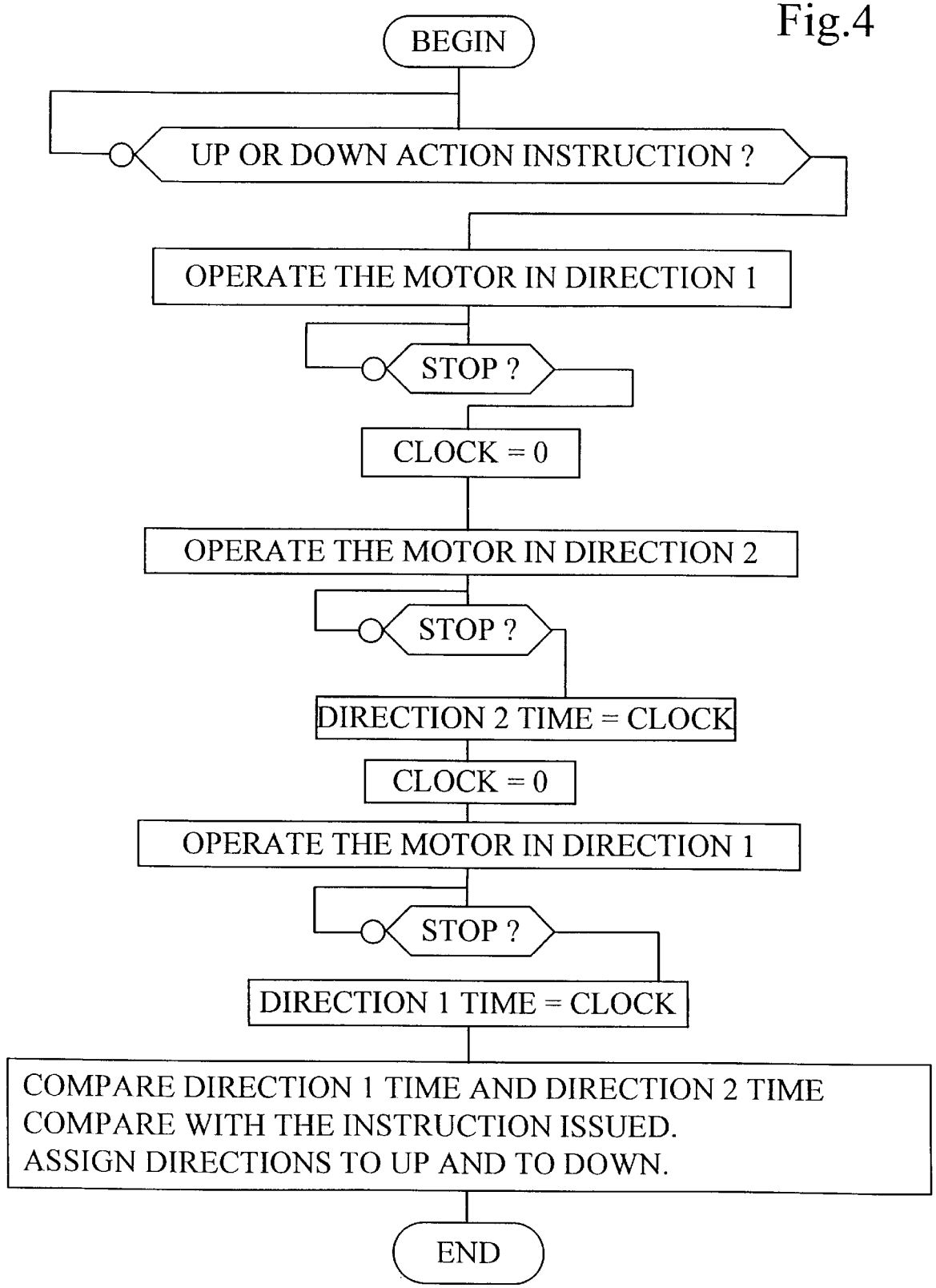
FIG. 4 represents the flowchart of a variant of this first mode of execution.

Instead of the significant displacement corresponding to a certain number of revolutions of the winding tube, one revolution in the example described, this significant displacement could be the displacement of the roller blind between a top stop and a bottom stop, more particularly between a top stop corresponding to complete winding and a bottom stop corresponding to complete unwinding of the roller blind. In this case, the significant displacement is therefore equal to a dynamic working range of the roller blind. The flowchart of the program of this variant is represented in FIG. 4.

Let us assume that the user issues an up instruction to the control point. The automechanism, which understands that the instruction is an up instruction, instructs a movement in the direction 1. This movement is interrupted when the roller blind encounters a stop. The automechanism then initializes the clock and instructs the motor to reverse its direction of rotation and hence to turn in the direction 2.

The movement is interrupted when the roller blind again encounters a stop. The time counted by the clock is saved in the memory MT2 in the guise of DIRECTION 2 TIME and the automechanism instructs the motor to turn in the other direction, that is to say the direction 1. Simultaneously, the clock is reinitialized.

The movement of the roller blind is again interrupted when the latter again encounters a stop and the time measured in the clock is saved in the memory MT1 in the guise of DIRECTION 1 TIME.

The automechanism compares the DIRECTION 1 TIME and DIRECTION 2 TIME and compares the difference with the instruction received, as in the main mode of execution.

An advantage of this variant is that it allows recognition of the top and bottom stops by storing the corresponding positions of the counter.

Another advantage of this variant is that irrespective of the mass of the roller blind, which influences the amplitude of the displacement to be regarded as significant, the device is under optimal conditions of operation.

Instead of measuring the time taken by the roller blind to travel a significant distance, it is possible, conversely, to measure the distance traveled by the roller blind in a specified and fixed time interval. For this purpose it is possible to use the same means as those represented in FIG. 2. The clock will serve to measure the fixed time and the memories MT1 and MT2 will serve to save the displacements in a first direction and in a second direction. The pulses emitted by the coder DC are counted by an incremental counter of elementary displacements IC so as to measure the space traveled by the roller blind.

Figure 5:
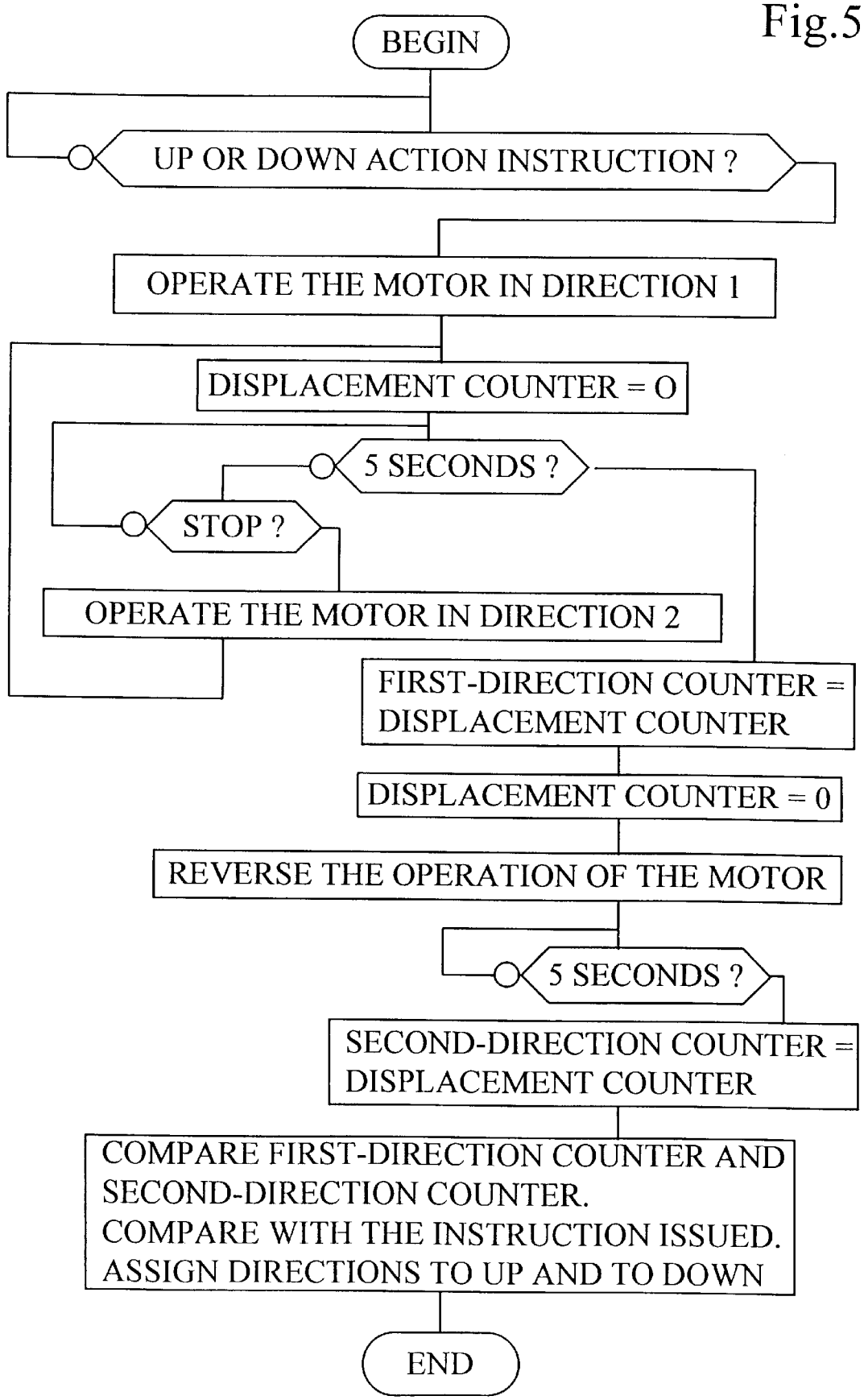
FIG. 5 represents the flowchart of the second mode of execution.

The flowchart of the exploration program is represented in FIG. 5.

Let us assume, as in the previous cases, that the user, when switching on the installation, issues an up instruction to the control point. The automechanism, which understands that the instruction is an up instruction, instructs a movement in the direction 1 and initializes the displacement counter.

If, following the elapsing of the fixed time, five seconds in the example considered, the roller blind has not encountered a stop, the movement is interrupted and the state of the displacement counter is saved in the memory MT1.

Next, the automechanism again initializes the displacement counter and instructs the motor to turn in the other direction, that is to say in the second direction.

After five seconds the movement is interrupted and the state of the displacement counter is saved in the memory MT2.

The processor next compares the values stored in MT1 and MT2 and compares the difference with the instruction issued.

If the distance traveled in the direction 1 is less than the distance traveled in the direction 2, the direction 1 corresponds to winding and the direction 2 to unwinding, and the action performed, in the example considered, corresponds to the instruction issued by the user. The automechanism assigns the direction 1 to an up instruction and the direction 2 to a down instruction.

If, on the other hand, the distance traveled in the direction 1 is greater than the distance traveled in the direction 2, this implies that the direction 1 corresponds to unwinding of the shutter and that the action performed does not correspond to the instruction issued by the user. The automechanism then assigns the direction 2 to an up instruction and the direction 1 to a down instruction. As before, this assignment is stored in the REVERSAL OF INSTRUCTIONS memory which will be consulted by the automechanism on receiving any up or down instruction.

The quantity representative of the speed of rotation of the motor can be obtained in any other way, for example by means of a tachometer device.

We claim:

1. A control device for asynchronous motor (M) with two directions of rotation, used for driving a shutter or roller blind (RB) displacing at least approximately vertically, comprising a control point (CP) equipped with manually actuable Up and Down contacts, the actuation of which causes the rotation of the motor in the desired direction, a control and supply box (CB), containing a logic processing unit (LPU), between the control point and the motor, switching means controlled by the logic processing unit for supplying one or the other of the windings of the motor and means for establishing a direction of rotation of the motor corresponding respectively to the up and down instructions, characterized in that the means for establishing a direction of rotation of the motor comprise means (LPU, CLK, DC) for recognizing the direction of displacement of the shutter or roller blind through the measurement of a quantity representative of the speed of rotation of the motor and, in the logic processing unit, a memory of EEPROM type (MI) for recording the direction of rotation instruction to be issued to the motor in response to an instruction emanating from the control point and a programmed processor for comparing the recognized direction of displacement with the instruction emanating from the control point and for reversing, if necessary, the direction of rotation recorded in respect of this instruction.

2. The device as claimed in claim 1, wherein the means for recognizing the direction of displacement of the shutter or roller blind consist of means for measuring the time (CLK, MT1, MT2) taken by the shutter or roller blind to perform a significant displacement.

3. The device as claimed in claim 2, wherein said means for measuring the time consist of a clock (CLK) initialized on reception of an Up and Down instruction and of means (DC) for measuring significant displacement, the up and down times (MT1, MT2) counted by the clock being compared, the shorter time corresponding to down and the longer time to up.

4. The device as claimed in claim 1, wherein the means for recognizing the direction of displacement of the shutter or roller blind consist of means (CLK) for measuring the time taken by the shutter or roller blind to go from a bottom stop to a top stop and vice versa.

5. The device as claimed in claim 4, wherein the means for measuring the time consist of a clock (CLK) initialized on arrival against a stop, the logic processing unit being programmed in such a way as to operate the rotation of the motor in the reverse direction upon arrival at the stop, until the end of the measurement of the up and down times of displacement between the stops.

6. The device as claimed in claim 1, wherein the means for recognizing the direction of displacement of the shutter or roller blind consist of means (DC, CD) for measuring the displacement of the shutter or roller blind for a significant time.

7. The device as claimed in claim 6, wherein said means of measuring the displacement consist of an incremental counter of elementary displacements (IC) initialized on reception of an Up and Down instruction and of means (CLK) for counting a significant time, the displacements counted by the up and down displacement counter being compared, the shorter displacement corresponding to up and the longer displacement to down.

* * * * *